(12) United States Patent
Lekontsev et al.

(10) Patent No.: US 11,201,928 B2
(45) Date of Patent: Dec. 14, 2021

(54) METHOD OF REFERENCING A CONNECTION SESSION WITH A WIRELESS COMMUNICATION DEVICE IN A LOCAL AREA, A SYSTEM FOR IMPLEMENTING THIS METHOD, A METHOD OF REFERENCING AN APPLICATION USER, A MACHINE-READABLE MEDIUM FOR IMPLEMENTING THIS METHOD, AS WELL AS A METHOD OF COLLECTING DATA ON THE WIRELESS COMMUNICATION DEVICE USER, AND A MACHINE-READABLE MEDIUM FOR IMPLEMENTING THIS METHOD

(71) Applicants: Igor Sergeevich Lekontsev, Perm (RU); Kamil Faritovich Islamov, Naberezhnye Chelny (RU)

(72) Inventors: Igor Sergeevich Lekontsev, Perm (RU); Kamil Faritovich Islamov, Naberezhnye Chelny (RU)

(73) Assignee: Aleksei Leonidovich Kalinichenko, Moscow (RU)

( * ) Notice: Subject to any disclaimer, the term of this patent is extended or adjusted under 35 U.S.C. 154(b) by 129 days.

(21) Appl. No.: 16/328,435

(22) PCT Filed: Nov. 11, 2016

(86) PCT No.: PCT/RU2016/000769
§ 371 (c)(1),
(2) Date: Feb. 26, 2019

(87) PCT Pub. No.: WO2018/044198
PCT Pub. Date: Mar. 8, 2018

(65) Prior Publication Data
US 2020/0274935 A1    Aug. 27, 2020

(30) Foreign Application Priority Data

Aug. 26, 2016    (RU) .......................... RU2016134944

(51) Int. Cl.
*H04L 29/08* (2006.01)
*H04L 29/12* (2006.01)
(Continued)

(52) U.S. Cl.
CPC ............ *H04L 67/146* (2013.01); *G06F 16/22* (2019.01); *H04L 61/20* (2013.01); *H04L 61/308* (2013.01);
(Continued)

(58) Field of Classification Search
CPC ......... H04W 84/12; H04W 8/18; H04W 8/26; H04W 76/11; H04L 61/308; H04L 61/20;
(Continued)

(56) References Cited

U.S. PATENT DOCUMENTS 7,099,946 B2 *   8/2006   Lennon ............. G06K 9/00677
                                                    709/227
9,621,657 B2 *   4/2017   Hussein ............. H04L 67/1027
(Continued)

FOREIGN PATENT DOCUMENTS

WO    WO2015108447    7/2015

*Primary Examiner* — Abdullahi E Salad
(74) *Attorney, Agent, or Firm* — Aleksandr Sumshkovich

(57) ABSTRACT

There is proposed a system and method for identifying at least one application user (user) of at least one wireless communication device (device). The method envisages —providing a server connected with a machine-readable medium including at least part of a database and configured to transmit data to the device, —creating an identifier of a connection session (session identifier) with the device wherein the session identifier is associated with the device's identifier, —saving the session and device's identifiers in the
(Continued)

database, —transmitting the session identifier to the device to be recorded in the device's storage, —receiving the session identifier and the user's identifier from the device, —saving the session identifier and the user's identifier in the database, and —associating the session identifier and the user's identifier with the device identifier.

2 Claims, 3 Drawing Sheets

(51) Int. Cl.
*H04W 76/11* (2018.01)
*G06F 16/22* (2019.01)
*H04W 84/12* (2009.01)

(52) U.S. Cl.
CPC ........... *H04L 67/141* (2013.01); *H04W 76/11* (2018.02); *H04L 61/6022* (2013.01); *H04W 84/12* (2013.01)

(58) Field of Classification Search
CPC . H04L 67/141; H04L 61/6022; H04L 67/146; G06Q 30/0269; G06Q 30/0261; G06F 16/22
See application file for complete search history.

(56) References Cited

U.S. PATENT DOCUMENTS

| | | | |
|---|---|---|---|
| 2002/0080822 A1* | 6/2002 | Brown | H04L 29/12009 370/475 |
| 2003/0084165 A1* | 5/2003 | Kjellberg | H04L 67/1095 709/227 |
| 2006/0059125 A1* | 3/2006 | Yan | H04L 67/02 |
| 2006/0218287 A1* | 9/2006 | Dodrill | H04L 51/24 709/227 |
| 2008/0261598 A1* | 10/2008 | Tinnakornsrisuphap | H04W 92/22 455/436 |
| 2009/0017805 A1* | 1/2009 | Sarukkai | H04W 28/06 455/414.3 |
| 2011/0106616 A1* | 5/2011 | Bigby | G06Q 10/107 705/14.49 |
| 2012/0136721 A1* | 5/2012 | Ullah | G06Q 30/0269 705/14.53 |
| 2012/0260321 A1* | 10/2012 | Wendt | H04L 67/02 726/5 |
| 2013/0232161 A1 | 9/2013 | Yang | |
| 2014/0229626 A1* | 8/2014 | Qureshi | G06F 11/1443 709/227 |
| 2014/0254788 A1* | 9/2014 | Annapareddy | G06F 11/30 379/265.09 |

* cited by examiner

METHOD OF REFERENCING A CONNECTION SESSION WITH A WIRELESS COMMUNICATION DEVICE IN A LOCAL AREA, A SYSTEM FOR IMPLEMENTING THIS METHOD, A METHOD OF REFERENCING AN APPLICATION USER, A MACHINE-READABLE MEDIUM FOR IMPLEMENTING THIS METHOD, AS WELL AS A METHOD OF COLLECTING DATA ON THE WIRELESS COMMUNICATION DEVICE USER, AND A MACHINE-READABLE MEDIUM FOR IMPLEMENTING THIS METHOD

CROSS-REFERENCE TO RELATED APPLICATIONS

This application is a U.S. national stage application of an international application PCT/RU2016/000769 filed on 11 Nov. 2016, whose disclosure is incorporated herein in its entirety by reference, which international application claims priority of a Russian Federation patent application RU2016134944 filed on 28 Aug. 2016.

FIELD OF THE INVENTION

The invention pertains to wireless communication systems (in particular, radio communication), more specifically, the invention pertains to systems and methods of identifying users of wireless communication devices.

The system is mainly intended to distribute advertising and informational content in local areas, such as cinemas, restaurants, hotels, etc.

BACKGROUND OF THE INVENTION

There is a known method of referencing and identifying a wireless communication device (application WO 2015/108447 A1 dated 14 Jan. 2015). The known method comprises stages during which a network packet comprising the device identifier is received; the device identifier is determined; the identifier is checked for presence in the database; if the device identifier is absent from the database, an installed application is launched, which sends a registration request to the system, resulting in the device identifier and an associated application identifier being recorded in the database; if the device identifier is present in the database, the application identifier corresponding to this device, which serves as an address for sending push notifications, is taken from the database. The known method allows the identification of mobile devices based on geolocation in local areas.

The drawback of the known method is that it allows to reference the user of a wireless communication device or the device itself only when the device has the application installed, the device is in the local area and is connected to the Wi-Fi network. It imposes temporal and functional limitations on the capability for collecting data on the behaviour and preferences of the wireless communication device user. Thus, the known solution does not provide adequate capabilities for referencing and identifying wireless communication devices in local areas.

The known system was accepted as the closest equivalent (prototype) of the present invention.

SUMMARY OF THE INVENTION

The developers of the present invention were faced with a task of expanding the capabilities for referencing and identifying wireless communication devices in local areas.

For the purposes of this application, local areas shall mean, specifically, areas covered by wireless local area networks, which operate, for example, using the IEEE 802.11 or IEEE 802.15.1 standard, or other wireless networks based on the IEEE 802.11 standard. The coverage may be provided by one or several wireless communication modules. For the purpose of brevity, in the present summary, such networks shall be called local wireless networks (or Wi-Fi networks), while the data transmission channels comprising such a network shall be called local wireless data transmission channels (or Wi-Fi data transmission channels).

A wireless communication device in this application shall mean any device capable of receiving and transmitting data via local wireless data transmission channels.

The network resource in this application shall mean a document or an informational resource which can be accessed remotely from another device via a data transmission network. In the preferred embodiment of the invention, the network resource is accessed via a browser.

A network packet in this summary shall mean a formatted unit of data (message) and transmitted via the network.

The objective of referencing and identifying wireless communication devices in local areas is to ensure the capability for collecting data on the behaviour and preferences of the wireless communication device user.

The technical result of the disclosed invention consists in the expansion of the capabilities for collecting data on wireless communication device users.

The technical result is achieved mainly in three aspects of the invention: first—the method of referencing the connection session with a wireless communication device; second—the method of referencing the application user; and third—the method of collecting data on the wireless communication device user. The results of applying the invention in the first two aspects are required to implement the invention in its third aspect.

The first aspect of the invention describes the method of referencing the connection session in the local area with the wireless communication device comprising a data storage. The method comprises stages during which a communication network, at least one server and access module are provided, wherein the server is connected with at least one machine-readable medium comprising at least a part of the database, and the access module configured to transmit data to the server and capable of transmitting data to the wireless communication device via the local wireless data transmission channel;

the wireless communication device sends a network packet comprising the wireless communication device identifier to the access module;

the access module receives the said network packet;

the wireless communication device identifier is determined;

the session identifier is created;

the session identifier is associated with the wireless communication device identifier;

at least where the wireless communication device identifier is absent from the database, the device identifier is saved in the database;

the session identifier associated with the session identifier is saved in the database;

the session identifier is transmitted to the wireless communication device;

the session identifier is saved in the data storage of the wireless communication device.

The expansion of the capabilities for collecting data on wireless communication device users in the first aspect of the invention is achieved due to the fact that the method enables centralised acquisition of data on the user's offline preferences and behaviour based on their location data with reference to the existing unique identifier of the wireless communication device (e.g. MAC address) without the need for additional permissions or software or hardware modifications.

The second aspect of the invention describes the method of referencing the application user. The method comprises stages during which a wireless communication device comprising a browser is provided, as well as an application configured to be installed on a wireless communication device and comprising an application user referencing module;

the application user identifier is set;

the application is installed on the wireless communication device;

the application user referencing module creates a uniform resource identifier (URI) comprising the application user identifier;

the application user referencing module creates a network resource address comprising the uniform resource identifier using the HTTP protocol;

the browser of the wireless communication device is directed to the network resource in accordance with the network resource address;

the network resource comprises a script which when executed causes the browser of the wireless communication device to save the application user identifier in the browser's storage.

The expansion of the capabilities for collecting data on wireless communication device users in the third aspect of the invention is achieved due to the fact that the method provides for the capability for referencing the application user and recording the application user identifier in a server-readable storage accessible for reading the application user identifier associated with the session identifier.

The third aspect of the invention describes the method of collecting data on the wireless communication device user. The method comprises stages during which at least one server is provided, connected with at least one machine-readable medium comprising at least a part of the database, and the server is configured to transmit data to wireless communication devices;

the wireless communication device identifier is received;

the identifier of a connection session with the wireless communication device is created;

the said session identifier is associated with the said device identifier;

the said session identifier and the said device identifier associated therewith are saved in the database;

the session identifier is transmitted to the wireless communication device, to be recorded in the storage of the wireless communication device;

at least one session identifier and at least one application user identifier are received from the wireless communication device;

at least one application user identifier and at least one session identifier are saved in the database;

at least one said application user identifier and at least one said session identifier are associated with the device identifier.

The expansion of the capabilities for collecting data on wireless communication device users is achieved due to the fact that only one condition must be met in order to apply the described method of referencing the wireless communication device: the wireless communication device is connected to the network in the local area, or the application is installed. Thus, there is no need for these conditions to be met simultaneously. It considerably expands the capabilities for collecting data on wireless communication device users and, in particular, to reference and identify wireless communication devices thanks to the possibility to acquire, among other information, data on the behaviour of the wireless communication device user prior to the installation of the application.

DESCRIPTION OF PREFERRED EMBODIMENTS OF THE INVENTION

Figure 1:
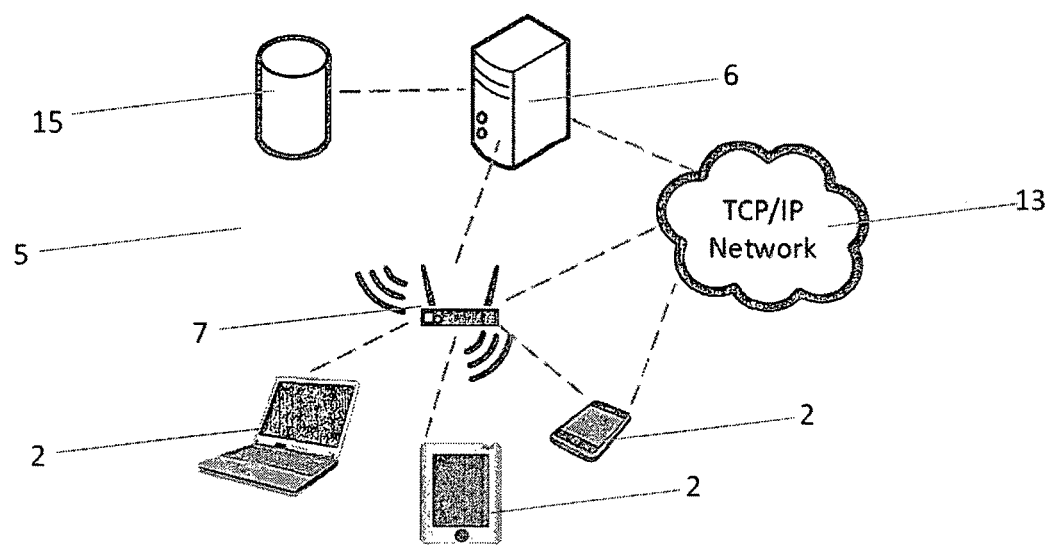
FIG. 1—diagram of the system of referencing a connection session with a wireless communication device according to one of the embodiments of the invention.
Figure 2:
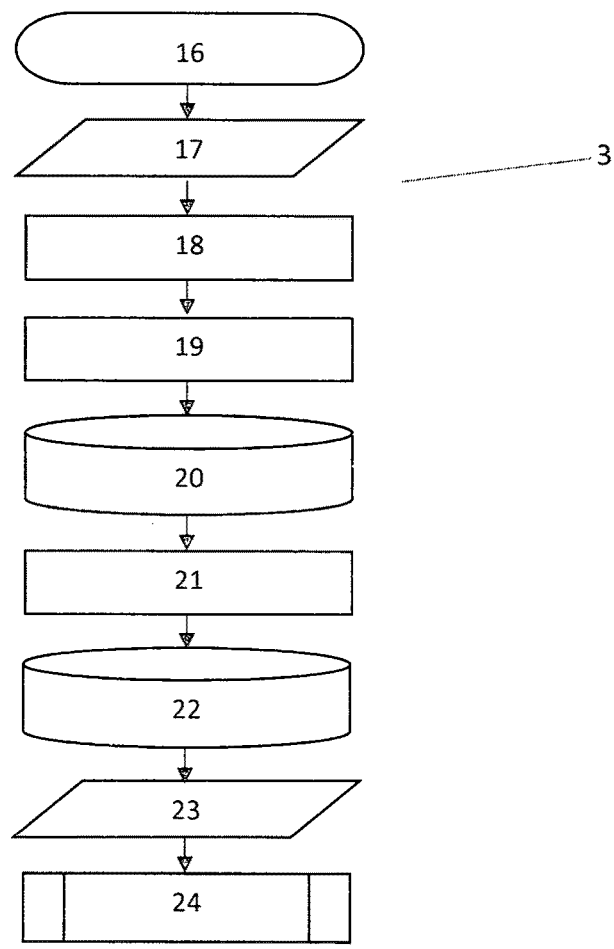
FIG. 2—flowchart of the algorithm of the method of referencing a connection session with a wireless communication device in the local area.
Figure 3:
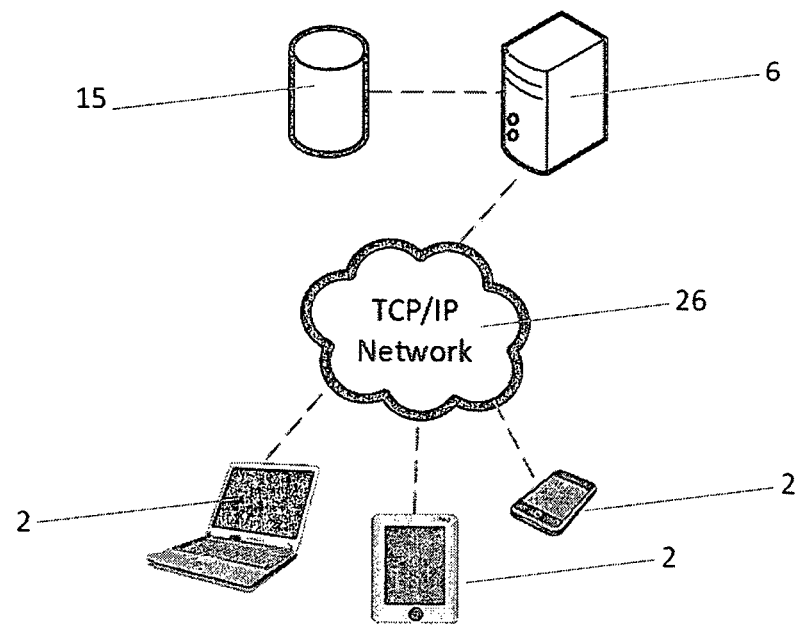
FIG. 3—diagram of the system of referencing a wireless communication device user.
Figure 4:
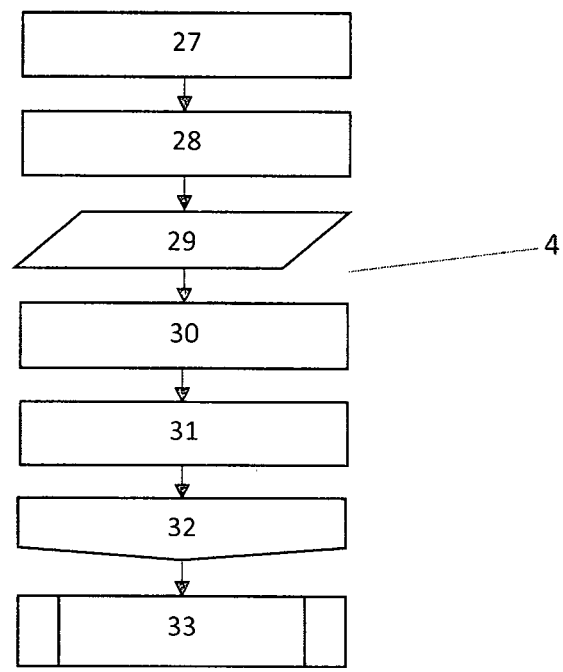
FIG. 4—flowchart of the algorithm of the method of referencing a wireless communication device user.
Figure 5:
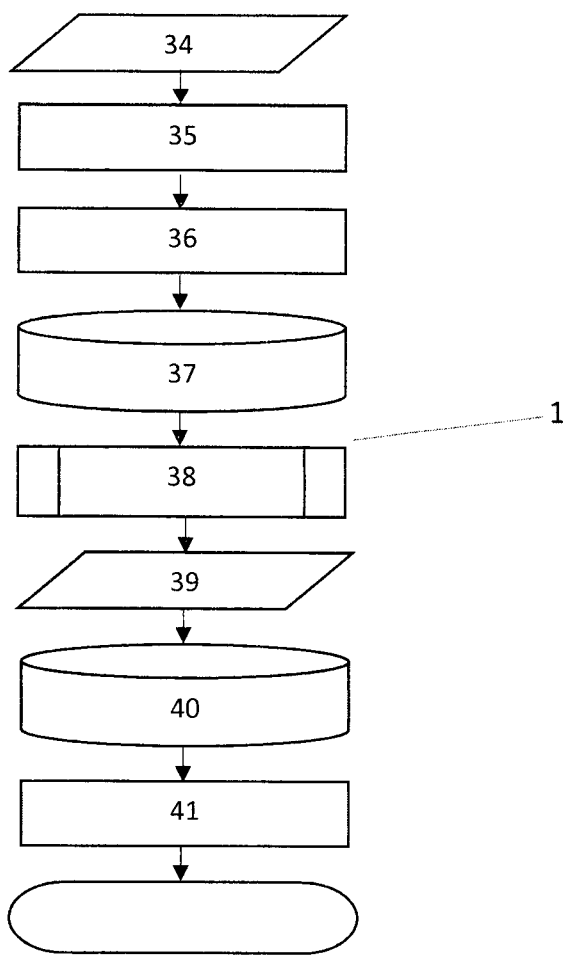
FIG. 5—flowchart of the algorithm of the method of collecting data on the wireless communication device user.
Figure 6:
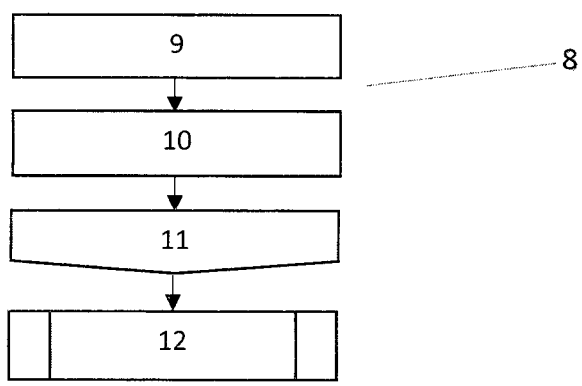
FIG. 6—flowchart of the procedure for saving data in the wireless communication device browser storage.

The method 1 of collecting data on the wireless communication device 2 user in accordance with the present invention provides for collecting data on the user's behaviour by registering (referencing) connection sessions of the wireless communication device 2 in wireless local area networks, registering applications installed on the user's wireless communication device 2 by referencing the applications user, as well as for collecting data on the wireless communication device 2 user by correlating these data for subsequent processing. This correlation can be regarded as identification of wireless communication device 2 users.

Within the framework of the invention, collection of data on the wireless communication device 2 user requires referencing at least one connection session of the wireless communication device 2 and referencing at least one application installed on the user's wireless communication device 2. For this reason, the present technical solution comprises a group of inventions representing a single inventive concept: the method 3 of referencing the connection session with the wireless communication device 2, the method 4 of referencing the wireless communication device 2 application user, and the method 1 of collecting data on the wireless communication device. Additional aspects of the invention cover the system 5 of referencing the connection session of the wireless communication device 2 in the local area, a machine-readable medium for implementing the method of referencing the wireless communication device 2 application user, and a machine-readable medium enabling the implementation of the method 1 of collecting data on the wireless communication device 2 user, which represent the means of implementing the methods comprising the group of inventions.

At the same time, the invention may be used separately in each of the aspects, providing for the achievement of the claimed technical result. For instance, data collected during the implementation of the method 3 of referencing connection sessions with the wireless communication device 2 can be correlated with the user identifier obtained by other means, e.g. entered manually by the user. Thus, the user can provide a telephone number, e-mail address, personal web page address or other personal details and/or identifiers. In a similar way, the data generated during implementation of the method 4 of referencing the application user can be associated with a certain user identifier or device identifier and filed in a storage accessible to the data collection system for subsequent processing, which also expands the capabilities for collecting such data without the need for additional permissions and actions on behalf of the user, or wireless communication device software modification.

The method 3 of referencing the connection session with the wireless communication device 2 in the local area, in accordance with the invention, implies that the wireless communication device 2 comprises a data storage. Such data storage can be represented by any data storage where data can be saved under the management of the system of referencing the connection session with the wireless communication device, specifically, at least the device identifier and the session identifier, and also preferably at least the wireless communication device user identifier and the application user identifier.

In certain embodiments of the invention, a permission is required for the system 5 of referencing the connection session, the wireless communication device 2, the application or other software or hardware tools to save data in the wireless communication device storage. Also, in certain embodiments of the invention, a permission is required for the system 5 of referencing the connection session, the server 6, the application, the access module 7 or other hardware or software tools to read data from the wireless communication device storage 2. In these embodiments, the respective permission is obtained, which requires additional actions on behalf of the mobile communication device 2 user and/or additional modifications of the hardware or software of the mobile communication device 2, the access module 7 or other hardware or software tools.

The need to obtain a permission or modify software results in some devices failing to be referenced and identified. This reduces the completeness of data obtained when referencing or identifying wireless communication devices 2. In other words, it narrows the capabilities for collecting data on wireless mobile device 2 users. Besides, it is often prohibited by law for the MAC address of wireless communication devices to be saved by applications, which further complicates the situation.

To expand the capabilities for referencing and identifying wireless communication devices 2, in the preferred embodiment of the invention, the wireless communication device 2 browser storage is used as the wireless communication device 2 storage. In the most preferable embodiments, the local storage of the wireless communication device 2 browser, cookie files or similar technologies, e.g. the Local Storage technology, can be used as such storage. The procedure 8 for saving data in the wireless communication device 2 browser storage and reading these data, within the framework of the invention, can be implemented subject to the availability of standard permissions and does not require additional actions on behalf of the mobile communication device user or additional modifications. This enables further expansion of the capabilities for referencing and identifying wireless communication devices 2.

For instance, in the embodiment using the local storage of the wireless communication device browser (or browser storage) based on the cookie technology, the procedure 8 for saving data in the wireless communication device 2 storage can be implemented as follows. When a certain identifier needs to be saved, a uniform resource identifier (URI) comprising the identifier that needs to be saved is created 9 using the HTTP protocol. In addition, a network address comprising the uniform resource identifier (URI) is created 10. A network address can be created 10 by an application installed on the wireless communication device 2, a software module included in this application (e.g. SDK module), the server 6 or other elements of the system. After that, the browser of the wireless communication device 2 is directed to the network resource using the created network address. The network resource comprises instructions (a script) which when executed cause the browser of the wireless communication device 2 to save 12 in its storage the identifier that needs to be saved. The identifier can be saved as part of the uniform resource identifier or separately, once it is extracted from the uniform resource identifier. Also, the uniform resource identifier itself can represent the identifier that needs to be saved in the browser storage. JavaScript can be used as the said instructions (script).

In the preferred embodiment of the invention, the standard browser of the wireless communication device 2 and the standard browser storage are used.

To enable data reading from the wireless communication device 2 browser storage, the resource to which the browser of the wireless communication device 2 is directed may comprise a JavaScript request to read cookie data or a similar local storage, e.g., Local Storage. A different available method can be used to read data from the wireless communication device 2 storage. Data in the wireless communication device browser storage can be read using the server 6 or other hardware or software tools connected to the server 6 with the capability for transmitting data.

In accordance with the invention, the method 3 of referencing the connection session with the wireless communication device 2 in the local area comprises a stage (not indicated) during which at least one server 6 and at least one access module 7 are provided. A communication network 13 may also be provided.

The access module 7 can be configured to provide access to the communication network 13. Any data transmission network, including the Internet, can serve as the communication network 13. The communication network 13 can be used in this method to transmit data. Communication channels outside the communication network 13 can also be used in the described method.

Also, the access module 7 is configured to transmit data to the server 6 and is capable of transmitting data to the wireless communication device 2 via the local wireless data transmission channel 14. The capability for transmitting data to the server 6 can be provided by any known methods, e.g. by providing a direct wire or wireless communication channel, via a local data transmission network, or by transmitting data via the communication network 13.

In accordance with the invention, the server 6 is connected with at least one machine-readable medium comprising at least a part of the database 15. In the claims of the invention, the server 6 is mentioned in the singular. The availability of one server 6 in the system 5 of referencing the connection session is a necessary and sufficient condition for the functioning of the said system 5 and achieving the technical result. At the same time, it is obvious that in order to enhance performance, functional capabilities and redundancy capability the system 5 can be distributed and comprise several servers 6, and the functions can be distributed among them. The server 6 can also be connected with a network resource capable of reading data from the browser storage of the device requesting the network resource. The server 6 can also be connected with a network resource capable of reading (receiving) information from the uniform resource identifier included in the network address used to direct the device browser to the network resource.

The database 15 can be comprised in one machine-readable data medium, or distributed among several machine-readable media. The database 15 is configured to store at least device identifiers, application user identifiers, and identifiers of connection sessions with the wireless communication device. The "server is connected with a machine-readable medium . . . " feature shall mean that the server 6 is capable of saving data in the database 15 and managing it, specifically, saving at least device identifiers, application user identifiers, and session identifiers, and associating them with each other in accordance with the invention. The connection of the server 6 with at least one machine-readable medium can be implemented using any data transmission channels.

The method 3 of referencing the connection session with the wireless communication device 2 (method 3 of the session referencing) further comprises the stage during which the wireless communication device 2 sends 16 a network packet comprising the wireless communication device 2 identifier to the access module 7. The network packet can be any message. For example, this message can be a request for access to the wireless local area network or the communication network 13. In the preferred embodiment of the invention, the MAC address of the wireless communication device 2 is used as its identifier. The MAC address allows unique identification of the wireless communication device 2 as a wireless local area network node for reciprocal data transmission with this node. In accordance with the IEEE 802.11 standard, the wireless communication device 2 sends its MAC address to the access module 7 together with the network packet, which is a necessary condition for registering the wireless communication device 2 in the wireless local area network. Thus, the network packet in networks based on the IEEE 802.11 standard comprises the unique address of the device's network interface card—MAC address. In other embodiments of the invention, other identifiers can be used, e.g. the IP address or specifically generated sequences of symbols unique for wireless communication devices. A unique sequence of symbols, which is a derivative of the MAC address or another identifier, obtained, for example, as a result of coding following a certain predetermined algorithm or in accordance with a certain function, can also be the identifier of the wireless communication device 2. The network packet received by the access module 7 may refer to the provision of access to the communication network 13 for the wireless communication device 2.

Subsequently, the access module 7 receives 17 the said network packet comprising the wireless communication device 1 identifier, after which the wireless communication device 2 identifier is determined 18. The wireless communication device 2 identifier (device identifier) can either be determined 18 at the access module 7 and then be transmitted to the server 6, or transmitted to the server 6 together with the network packet, after which the device identifier can be determined 18 at the server 6. As a result of determining 18 the device identifier, it is adjusted to the format that can be saved in the database 15. The device identifier can also be transmitted in an encrypted form, which is not outside the framework of the invention. Thus, the determination 18 of the device identifier can be performed both by the access module 7 and the server 6, and it can comprise operations of transmitting the device identifier or its derivatives in this or that form to the server 6. Thus, the determination 18 of the device identifier can be performed by the system 5 of referencing the session identifier. The network packet can be included in a request by the wireless communication device for access to the wireless communication network or a request for access to the communication network 13. In this embodiment, access can be opened in case of successful referencing of the connection session, or in case the device identifier is present or successfully saved in the database 15.

In certain embodiments of the invention the method 3 of referencing the connection session comprises stages during which the device identifier is determined 18 by the access module, after which the access module transmits the device identifier to the server 6; the session identifier can be created at the server 6 and transmitted to the access module 7, or be created by the access module 7; the session identifier is transmitted to the wireless communication device 2. In these embodiments the access module 7 must be configured to determine the device identifier, e.g. MAC address; transmit the device identifier to the server 6, receive or create the session identifier and transmit it to the wireless communication device 2. The session identifier can be transmitted to the wireless communication device 2 using the method described in this description by directing the device browser to the network resource using the created network address comprising the uniform resource identifier and saving data from the universal resource identifier in the device browser storage.

In another embodiment of the invention, the wireless communication device 2 identifier is transmitted to the server 6 due to the fact that the method comprises stages during which, after the wireless communication device 2 identifier is determined 18, the access module 7 creates a network resource address (URL) comprising the uniform resource identifier (URI) which comprises the wireless communication device 2 identifier; the wireless communication device 2 browser is directed to the network resource using the created network address; the server receives the device identifier. The server's capability for receiving the device identifier can be provided due to the fact that the server is connected with the network resource. After the wireless communication device 2 browser is directed to the created network address, the device browser creates a network (HTTP) request for access to the network resource. This request can be processed both by software and hardware tools (e.g. web server) which are included or not included in the system 5 of referencing the connection session. During the processing, the information from the uniform resource identifier (URI) can be read and sent to the server 6. Along with the device identifier, the access module 7 can also send to the server 6 other data associated with the resource identifier, e.g. the access module 7 identifier which can be associated with the location of the wireless communication device and/or other parameters. The advantage of this embodiment of the invention is that it can use any of the range of known wireless network access modules capable of reading (determining) the actual or hashed MAC address, capable of creating a uniform resource identifier and network resource address, and capable of redirecting the wireless communication device 2 browser to the network resource using the created network resource address. The access module in this embodiment can be incapable of receiving and creating session identifiers. Thus, known access modules with the said capabilities can be used to implement this embodiment of the invention, which further expands the capabilities for collecting data on wireless communication device users.

The method 3 of referencing the connection session with the wireless communication device also comprises the creation 19 of the identifier of the connection session (or session identifier) with the wireless communication device 2. In the preferred embodiment of the invention, the device identifier is subsequently saved 20 in the database 15. For this purpose, it can be transmitted in advance to the server 6. In separate embodiments, the access module 7 can be configured to save 20 the session identifier in the database 15; for this purpose the access module 7 can be connected, with the capability for recording, with the machine-readable medium comprising the database 15. In the preferred embodiment, the session identifier is created 19 by the server 6 and associated 21 with the received device identifier. However, in other embodiments, the session identifier can also be created 19 by the access module 7 or another computing device for subsequent transmission to the server and saving 22 in the database 15. The session identifier can represent any sequence of symbols, numbers, or parameter values, or it can be represented in any known form, without limitation to the present invention.

The method 3 of referencing the connection session comprises stages during which the identifier of the wireless communication device 2 is saved 20 in the database 15, the session identifier is associated 21 with the device identifier, and the session identifier is saved 22 in the database 15. These actions can be performed in any order, which in itself does not affect the implementation of the purpose of the invention and the achievement of the technical result. The claims of the invention and the figures of the drawings represent only one option of the order of performing these actions.

The identifier of the wireless communication device 2 and the session identifier are saved 20 in the database 15 by the system 5 of referencing the connection session; in the preferred embodiment of the invention, the saving 20 is managed by the server 6.

In accordance with the invention, the method 3 of referencing the connection session further comprises the stages during which the session identifier is transmitted 23 to the wireless communication device 2 and saved 24 in the data storage of the wireless communication device 2. In the majority of embodiments of the invention, the device identifier is not transmitted to the wireless communication device 2 and not stored therein, which is due to the limitations on access to the MAC address on behalf of applications imposed by the majority of the operating systems on devices.

In the preferred embodiment of the invention, the local storage of the wireless communication device 2 browser can be used as the data storage of the wireless communication device 2. Any other data storage can also be used, to which access can be provided for reading and recording on behalf of the server, and access at least for recording on behalf of the application.

In the preferred embodiment of the invention, a network resource (e.g. a landing page) can be used to transfer 23 the session identifier to and save 24 it in the wireless communication device 2. For this purpose, the system 5 of referencing the connection session can create 9 a uniform resource identifier (URI) comprising the session identifier, create 10 a network address (URL) of the network resource comprising the uniform resource identifier (URI). At the same time, the method comprises the stage during which the browser of the wireless communication device 2 is directed to the network resource using the network address comprising the uniform resource identifier which comprises the session identifier. Creation 9 of a uniform resource identifier, creation 10 of a network address and/or redirection 11 can be performed by the server 6, the access module 7 or other hardware or software tools. The standard browser of the wireless communication device, e.g. the pre-installed standard browser on a smartphone, can be used to save the identifier in one storage. The network resource comprises a script (instructions) which when executed causes the wireless communication device 2 browser to save in its storage the transmitted identifier. Such instructions may be represented by JavaScript, which forces the wireless communication device 2 browser at least to read the session identifier comprised in the uniform resource identifier from the network address after the network resource is downloaded (e.g. a web page is opened); and save the session identifier in the local storage of the wireless communication device 2 browser. The session identifier is preferably saved as a certain variable in the browser's cookie file or another similar browser storage, e.g. based on the Local Storage technology, for which an unlimited life cycle can be established.

In the terms of this description, the network resource can be an independent resource, e.g. an independent web page, or an embedded or "built-in" resource, e.g. based on the iFrame technology and placed on one or several third-party pages. The network resource can also be connected with the server 6, the access module 7 and/or the system. In particular, the network resource can be located on the server 6; the server 6 can have access to the network resource; or the server 6 can be configured to manage the network resource. The server 6 can be configured to read the uniform resource identifier (URI) from the network resource address (URL). The system 5, in particular the server 6 and/or the access module 7, as well as the application can be configured to create the network resource address comprising the uniform resource identifier, wherein the uniform resource identifier can comprise the data which is being transmitted and/or saved.

In certain embodiments of the invention, after the device identifier is received by the system 5 or, in particular, by the server 6, the database 15 can be checked for the presence of the transmitted wireless communication device 2 identifier, as well as of other identifiers or parameters. Depending on the check results, separate stages of the method 3 can be performed or cancelled. For example, the method 3 can comprise a check of the database 15 for the presence of the device identifier, and if the device identifier is present in the database 15, its saving in the database 15 is not performed. This embodiment of the method 3 is not outside the framework of the invention because the device identifier was saved in the database 15 earlier. Also, if necessary, the database 15 can be checked for the presence of one or several user identifiers: e.g. a telephone number, name or other data. Depending on the results of the check, a corresponding identifier can be requested or not requested.

In an additional embodiment, the method 3 can comprise setting additional user identifiers associated with the session identifier; these identifiers can be transmitted to the server 6, associated with the device identifier, and saved in the database 15. The transmission can be performed using any method, including a method similar to the procedure for saving data in the wireless communication device 2 browser storage with the identifiers being subsequently read from the storage. Additional parameters can be set manually by the user upon request from the system 5 via a network resource or using other methods.

The system 5 of referencing the connection session with the wireless communication device 2 in the local area (system 5 of referencing the connection session) can be used to implement the described method 3 of referencing the connection session with the wireless communication device 2 in the local area. The wireless communication device 2 also comprises a data storage which, in the preferred embodiment of the invention, is the local storage of the wireless communication device 2 browser.

The system 5 of referencing the connection session also comprises at least one machine-readable medium comprising at least a part of the database 15; and the server 6 connected with at least one machine-readable medium comprising at least a part of the database 15.

Besides, the system 5 of referencing the connection session comprises at least one access module 7 configured to receive at least one network packet comprising the device identifier from the wireless communication device 2 via the local wireless data transmission channel. The access module 7 is also configured to transmit data to the server 6, for which purpose the access module 7 can be connected with the capability for transmitting data to the server 6 using at least one data transmission channel. In the preferred embodiment of the invention, the access module 7 is configured to transmit data to the wireless communication device 2 via the wireless local area network.

At the same time, the system 5 of referencing a connection session is configured to determine the wireless communication device 2 identifier and creating a session identifier associated with the wireless communication device 2 identifier. The capability for determining the wireless communication device 2 identifier can be provided by providing the access module 7 with the capability for determining the device identifier when the device's MAC address is used as such identifier. The device identifier can also be determined at the server 6, mainly in the embodiments where an identifier other than the device's MAC address, or an identifier derived therefrom is used as the device identifier. The session identifier can be created both at the server 6 and at another computing device capable of creating a session identifier which is unique for the session being referenced. In separate embodiments, the session identifier can be created by another server or the computing unit of the access module 7. Additionally, the uniqueness of the created session identifier can be checked.

In accordance with the invention, the session identifier is associated 21 with the identifier of the wireless communication device 2 the connection session with which is being referenced. The capability of the system 5 of referencing the connection session for associating 21 the session identifier with the wireless communication device 2 identifier can be provided by the capability for saving them in the database 15 as associated with each other. The association 21 can also be performed in the process of creation 4 of the session identifier, e.g. by linking the content of the session identifier with the content of the device identifier. It is important for the present invention that the device identifier and the session identifier be saved in the database 15 as associated with each other.

The server 6 is configured to save 22 the session identifier and saving 20 the wireless communication device 2 identifier associated therewith in the database 15. Besides, the system 5 of referencing the connection session is configured to transmit 23 the session identifier to the wireless communication device 2 to be saved 24 in the wireless communication device 2 storage. At the same time, in one of the embodiments, the system 5 of referencing the connection session is configured to transmit to the wireless communication device 2 a script (set of instructions) which when executed causes the wireless communication device to save 24 the session identifier in the wireless communication device 2 storage.

In the preferred embodiment of the invention, the wireless communication device 2 comprises a browser, and the data storage is the wireless communication device 2 browser storage. At the same time, in the preferred embodiment of the invention, the system 5 of referencing the connection session is configured to create 9 a uniform resource identifier which comprises the session identifier, creating 10 a network address which comprises the said uniform resource identifier, and directing 11 the wireless communication device 2 browser to the network resource using the created address. The network resource comprises a script (instructions) which when executed causes the wireless communication device browser to save 12 the transmitted session identifier in its storage.

As a result of using the method 3 of referencing the connection session, e.g. with the use of the system 5 of referencing the connection session, the unique identifier of the wireless communication device 2 and the identifier of the connection session with this device associated with the device identifier are saved in the database 15; while the connection session identifier is saved in the wireless communication device storage. If connection sessions with this wireless communication device 2 are established many times, the multitude of connection session identifiers associated with one device identifier, and consequently associated with each other, are saved in the wireless communication device storage.

If the identifier of the device with which a new connection session is being established is present in the database 15, there is no need to enter the device identifier again, while the connection session is associated 21 with the device identifier saved in the database 15 earlier. At the same time, it is obvious that in this case, too, the device identifier was previously saved 20 in the database 15, and the identifier of another connection session associated therewith was saved 22 as well. I.e., the device identifier is only saved in the database 15 at least when this device identifier is absent from the database 15.

The session identifier can be associated in the database 15, for example, with the location of the access module 7 (e.g. a Wi-Fi access point) and the time of establishing the connection session, as well as with any other parameters. The collected session identifiers already represent data on the users' behaviours since a connection session can characterise the user's location at a given time. Based on the set of session identifiers, a conclusion can be drawn as to the behaviour and preferences of the user associated with the device identifier. The session identifier can also be associated with a certain identifier of the access module 7 and other identifiers which characterise the behaviour of the wireless communication device user. At the same time, it can be transmitted to the server together with the wireless communication device identifier, or to the wireless communication device 2 and/or the server 6 together with the session identifier.

One of the tasks of the developers of the present invention was to provide for identification of the wireless communication device 2 based on its universal unique network identifier, MAC address, without the need to apply additional software or hardware modifications or obtain permissions. This embodiment, using the device's MAC address as the device identifier, provides for the capability for unambiguous referencing of the device based on other events, e.g. on the application user identifier based on the identifier initially assigned to any wireless communication device 2.

In the next aspect, the present invention represents the method 4 of referencing the application user, which provides for the capacity for associating the application user with the wireless communication device 2 identifier, e.g. with its MAC address. Operating systems on the majority of wireless communication devices do not allow applications to read and save the device's MAC address. To ensure the capacity for identifying the application user and associating the said user with the device based on the MAC address, it is proposed to save the application user identifier in the wireless communication device 2 storage available both for data recording on behalf of the user and data reading on behalf of a third-party device, e.g. the server 6. In accordance with the invention, the local storage of the wireless communication device 2 browser is used as such storage.

The system 25 of the application referencing required for the implementation of the method 4 of referencing the application user comprises a server connected with at least one machine-readable medium comprising at least a part of the database 15; data transmission network 26, e.g. the Internet. Wireless communication devices 2 are configured to transmit data to the server 6. The capacity for transmitting data between wireless communication devices 2 can be provided due to the fact that wireless communication devices 2 are configured to connect to the server 6 with the capability for transmitting data, e.g. by connecting to the Internet or another network using any known data transmission channels.

The user identifier in this description shall mean a certain identifier which enables unambiguous referencing of the user of at least one application. This identifier can be set outside the system 25 of referencing the application user (e.g. application store) and be received from the application itself, or be specified by the system 25 of referencing the application user, e.g. by the application user referencing module or the server 6. The aggregate of application user identifiers represents the data showing what applications the user installed. By providing the capability for associating the application user identifier with the wireless communication device identifier and session identifiers, the capability for determining the behaviours and preferences of users of specific applications both in the media environment and offline is provided. It should be understood that the application user identifier identifies the user of one application among other users of this application. It is obvious that one and the same user of the device on which the application is installed can have different identifiers in different applications.

In accordance with the invention, the method 4 of referencing the application user comprises a stage during which the application is provided (not indicated) which is configured to be installed on the wireless communication device 2 and which comprises an application user referencing module. The application can be provided by presenting it on a machine-readable medium available for transmission to the wireless communication device. Thus, the application can be located on a remote resource, access to which is provided by featuring it in an application store. The application user referencing module may represent a set of instructions included in the application or, for example, a standalone software module comprising a set of instructions and installed together with the application or separately.

The method of referencing the application user also comprises the stage during which the application user identifier is set 27. This identifier can be set 27 using means not included in the system: e.g. computing tools from the application store or from the application manufacturer. In this case, the identifier can be provided to the application user referencing module by the application itself. The application user identifier can also be set 27 by the application user referencing module. The stage during which the application user identifier is set 27 can be performed during the registration of the application (or the application user) in the system of referencing the wireless communication device user. The registration can be performed after or during the installation of the application on the wireless communication device.

Besides, the method 4 of referencing the application user comprises the stage during which the application is installed 28 on the wireless communication device 2. The application can be transmitted to be installed to the wireless communication device 2 via any known data transmission channel, either wired or wireless.

In one of the embodiments of the invention, the method 4 of referencing the application user comprises the stage during which the application user identifier is transmitted 29 to the wireless communication device 2. This stage is included in the method in case when the application identifier is set 27 by software and/or hardware tools not included in the system 25 of referencing the application user, or by software and/or hardware tools not comprised in the wireless communication device 2.

It should be understood that the stages of the method 4 can be performed in any order, staying within the framework of the invention: for example, the application user identifier can be set 27 prior to installing 28 the application; or, for example, the installation 28 of the application can be accompanied by the transmission 29 of the application user identifier to the wireless communication device 2.

The method 4 of referencing the application user further comprises the stage during which the application user identifier is saved in the wireless communication device 2 storage available for recording on behalf of the application and at least for reading on behalf of the server 6. In accordance with the invention, the wireless communication device 2 browser storage is used as such storage.

For the purpose of saving the application user identifier, the method 4 of referencing the application user comprises the stage during which the user referencing module creates 30 a uniform resource identifier (URI) comprising the application user identifier using the HTTP protocol. The user referencing module also creates 31 a network resource address (URL) using the HTTP protocol, which comprises the created 30 uniform resource identifier (URI) and, accordingly, the application user identifier.

Then, in accordance with the invention, the browser of the wireless communication device 2 is directed 32 to the network resource in accordance with the created 31 network resource address. The network resource comprises a script (instructions) which when executed causes the browser of the wireless communication device to save the application user identifier in the browser storage. This direction 32 of the wireless communication device browser can be performed under the management of the application user referencing module. JavaScript can be used as the said script, while cookie files or a similar technology, e.g. the Local Storage technology, can be used as the browser storage.

The method 4 of referencing the application user can additionally comprise the stage during which the device user identifier is determined. This identifier can be a mobile telephone number, first name and surname, e-mail address, address of a social network account, and/or any other parameters identifying the user. The said device user identifier can be associated with the application user identifier, enabling better identification of the wireless device user for whom behaviour and preferences data are being collected. The user identifier can be determined by the user setting it themselves, e.g. during registration or authentication in the application.

The device user identifier can be saved in the data storage of the wireless communication device, such as the browser storage, using a method similar to the procedure 8 for saving data in the browser storage.

For this purpose, the method 4 of referencing the application user is additionally characterised in that the created 30 uniform resource identifier also comprises the application user identifier; and the network resource comprises a script which makes the browser of the wireless communication device 2 save 33 the application user identifier in the browser storage.

This provides the capability for collecting data on the behaviour and preferences of the wireless communication device 2 user based on the applications installed on the wireless communication device 2. After the implementation of the method 4 of referencing the wireless communication device 2 user, the wireless communication device 2 browser storage comprises the application user identifier readable by the server 6.

Both after the performance of the said stages and prior to it, the method 4 can comprise the stages during which the wireless communication device identifier is transmitted to the server 6; the wireless communication device 2 receives 23 at least one session identifier associated 21 with the wireless communication device 2 identifier. I.e. the stages of the method 3 of referencing the connection session with the wireless communication device are performed. In the preferred embodiment, at least one session identifier and at least one application user identifier are saved in the browser storage for one and the same resource, due to which they can, under the management of the script comprised in this resource, be simultaneously read from the browser storage by the system of collecting data on the wireless communication device 2 user and associated with each other.

Also, the method 4 can comprise the stage during which at least one application user identifier is associated with at least one session identifier, and the stage during which the application user identifier is transmitted to the server 6 and saved in the database 15. The application user identifier can be transmitted together with the session identifier associated therewith. The fact that the session identifier is associated in the database with the wireless communication device identifier allows to associate the application user identifier with the device identifier. Thus, the capabilities for referencing and identifying the wireless communication device user and collecting data on the user's behaviour and preferences are additionally expanded.

A machine-readable medium comprising machine-executable instructions can be used to implement the method 4 of referencing the application user in accordance with the present invention. The machine-readable medium is characterised in that the instructions when executed cause the wireless communication device comprising the browser, browser storage, application, and application user identifier to perform the stages of the method 4 of referencing the application user, specifically those during which a uniform resource identifier (URI) comprising the application user identifier is created 30; a network resource address comprising the uniform resource identifier is created 31 using the HTTP protocol; the browser of the wireless communication device 2 is directed 32 in accordance with the network resource address to the network resource comprising a script which makes the browser of the wireless communication device save 33 the application user identifier in the browser storage.

The said instructions can be included in the application user referencing module, and the said machine-readable medium can be connected with the wireless communication device 2.

Besides, in specific embodiments of the invention, the method 4, implemented as the instructions are executed, can comprise the stages in accordance with different embodiments of the method 4 of referencing the application user, in accordance with the invention.

An additional capability provided by the method 3 of referencing the connection session and the method 4 of referencing the application user consists in that in case the device identifier (e.g. MAC address) is changed, its association in the database with session identifiers and with application user identifiers, as well as the fact that these identifiers are stored in the device browser storage, enable recording different (as a result of such change) identifiers of one device in the database and associating them with each other thanks to the association of these device identifiers with at least one session identifier and/or at least one application user identifier comprised in the wireless communication device browser storage and/or in the database. In this case the device can be identified not only by the identifiers of the device as such, but by a combination of different device identifiers with at least one session identifier and/or at least one application identifier. This also helps expand the capabilities for collecting data on wireless communication device users.

The collection of data on the wireless communication device user (method 1 of collecting data) is performed when the wireless device storage comprises at least one session identifier and at least one application user identifier. That is why the stages dealing with transmitting and receiving the required identifiers are included in this method 1 of collecting data; however, it is obvious that they are also included in the method 3 of referencing the connection session and the method 4 of referencing the application user in accordance with the invention, and when performed, these stages can coincide with the respective stages of different methods.

The method 1 of collecting data on the wireless communication device user in accordance with the invention is characterised in that it comprises the stage during which at least one server 6 is provided (not indicated), which is connected with at least one machine-readable medium comprising at least a part of the database 15; and the server 6 is configured to transmit data to wireless communication devices 2.

The method 1 of collecting data also comprises the stages during which the wireless communication device 2 identifier is received 34; the identifier of a connection session with the wireless communication device 2 is created 35; the said session identifier is associated 36 with the said device identifier; the said session identifier and the said device identifier associated therewith are saved 37 in the database 15; the session identifier is transmitted 38 to the wireless communication device 2 to be saved in the wireless communication device 2 storage. At the same time, in the preferred embodiment of the invention, the local storage of the wireless communication device 2 browser (browser storage) can be used as the wireless communication device 2 storage. In this case, the saving of the identifiers is performed in accordance with the saving procedure 8 used in the preferred embodiments of the method 3 of referencing the connection session and the method 4 of referencing the application user.

The listed stages can be performed either in advance of or immediately before the performance of the subsequent stages of the method 1, during which at least one session identifier and at least one application user identifier are received 39 from the wireless communication device 2; at least one application user identifier and at least one session identifier are saved 40 in the database 15; at least one said application user identifier and at least one said session identifier are associated 41 with the device identifier.

In the preferred embodiment, at least one session identifier and at least one user identifier are received 39 by the server 6 by directing the browser to the network resource comprising a script (instructions) which when executed causes at least one application user identifier and at least one session identifier to be read from the wireless communication device browser storage. The browser can be directed to the said network resource, for example, by the access module or the server. Once read, the identifiers are transmitted to the server 6 to be saved in the database 15. The application user identifier is associated 41 with the device identifier thanks to its association with the session identifier which was earlier associated 21 with the device identifier.

The method of collecting data can additionally comprise the stages during which the device user identifier is received from the wireless communication device 2; the device user identifier is saved in the database 15; the device user identifier is associated with the device identifier. As indicated earlier in the description, the device user identifier can comprise any identifier referencing the device user, e.g. a telephone number, e-mail address, address of a social network account or other identifier. The use of the device user identifier enables a more complete user identification.

To implement the method 1 of collecting data in accordance with the invention, a machine-readable medium can be used comprising machine-executable instructions which, when executed by the server 6 connected with at least one machine-readable medium which comprises at least a part of the database 15, and configured to transmit data to wireless communication devices 2, cause the server 6 to implement the method 1 of collecting data.

At the same time, the method 1 of collecting data comprises the stages during which the identifier of the wireless communication device 2 comprising the device data storage is received 34; the identifier of a connection session with the wireless communication device is created 35; the said session identifier is associated 36 with the said device identifier; the said session identifier and the device identifier associated therewith are saved 37 in the database; the session identifier is transmitted 38 to the wireless communication device 2 to be saved in the device data storage; at least one session identifier and at least one application user identifier are received 39 from the wireless communication device 2; at least one application user identifier and at least one session identifier are saved 40 in the database; at least one application user identifier, at least one session identifier and at least one device identifier are associated 41 with each other.

The method of collecting data can additionally comprise the stages during which the device user identifier is received from the wireless communication device 2; the device user identifier is saved in the database 15; the device user identifier is associated with the device identifier.

In the preferred embodiment of the invention, in the method 1 of collecting data, at least one session identifier and at least one application user identifier are transmitted and received by means of reading them from the wireless communication device browser storage and filing them in the said storage in accordance with the above-described methods and procedures.

Systems and devices in accordance with the invention usually comprise various machine-readable media. A machine-readable medium can represent any usable medium to which a system or device can have access, while this medium can comprise both a volatile and non-volatile medium, as well as a removable and non-removable medium. As an example, but without limitation, the machine-readable medium can comprise a computer storage environment and communication environment. A computer storage environment comprises both a volatile and a non-volatile, removable and non-removable medium produced based on any method or any technology used for storing such information as machine-readable instructions, data structures, software modules or other data. A computer storage environment can include, without limitation, RAM, ROM, electrically erasable programmable ROM (EEPROM), flash memory or any other memory technology, CD-ROM, digital versatile disc (DVD) or other optical disc memories, magnetic cassettes, magnetic tape, magnetic disc memory or other magnetic memories, or any other memory or medium which can be used to store the necessary data and to which a system or device can have access. A communication environment usually represents machine-readable instructions, data structures, software modules or other data in a modulated data signal, such as a carrier signal or other transportation mechanism, and comprises any information delivery environment. The term "modulated data signal" means a signal with one or several characteristics set or changed so as to encode information in the signal. As an example, but without limitation, a communication environment comprises a wired environment such as a wired network, as well as a wireless environment such as an acoustic, radio frequency, infrared and other wireless environment. Combinations of any of the said media (environments) should also be included among machine-readable media.

Storage drives and associated computer storage environment media discussed above provide for storage of machine-readable instructions, data structures, software modules and other data to ensure the functioning of systems in accordance with the invention, including for the implementation of methods in accordance with the invention.

The present invention has been described in detail with a reference to its preferred embodiments, however, it is obvious that different embodiments may be implemented within the claimed scope of legal protection determined by the claims of the invention.

The invention claimed is:

1. A method for collecting data on a user of a wireless communication device, including storage; said wireless communication device defines at least one application user identifier; wherein said method comprises the steps of:

providing at least one server, connected with at least one non-transitory machine-readable medium comprising at least a part of a database, and wherein the at least one server is capable of transmitting data to and receive data from said wireless communication device;

providing at least one access module configured for reading a wireless communication device identifier, wherein said wireless communication device identifier is a MAC address of said wireless communication device, contained in a source address field of a network packet transmitted by said wireless communication device via a local wireless network; and said at least one access module is capable of transmitting data to the at least one server, and is capable of transmitting data to the wireless communication device via the local wireless network;

transmitting the network packet by said wireless communication device via the local wireless network to the at least one access module;

receiving the wireless communication device identifier by the at least one access module, and reading the wireless communication device identifier from said source address field by the at least one access module;

transmitting the wireless communication device identifier by the at least one access module to the at least one server;

creating a session identifier of a connection session with the wireless communication device on the server;

associating said session identifier with said wireless communication device identifier on the server;

saving said session identifier and said wireless communication device identifier associated therewith in the database;

transmitting the session identifier by said at least one server to the wireless communication device, to be recorded in the storage of the wireless communication device;

receiving said at least one session identifier and said at least one application user identifier from the wireless communication device by the at least one server;

saving said at least one application user identifier and said at least one session identifier in the database; and associating said at least one application user identifier and said at least one session identifier with the wireless communication device identifier on the server.

2. The method according to claim 1, wherein said storage is a browser storage.

* * * * *